United States Patent [19]

Kainulainen

[11] Patent Number: 5,734,687
[45] Date of Patent: Mar. 31, 1998

[54] HIERARCHICAL SYNCHRONIZATION METHOD AND A TELECOMMUNICATIONS SYSTEM EMPLOYING MESSAGE-BASED SYNCHRONIZATION

[75] Inventor: Jukka Kainulainen, Helsinki, Finland

[73] Assignee: Nokia Telecommunications Oy, Espoo, Finland

[21] Appl. No.: 448,355

[22] PCT Filed: Nov. 8, 1993

[86] PCT No.: PCT/FI93/00459

§ 371 Date: May 2, 1995

§ 102(e) Date: May 2, 1995

[87] PCT Pub. No.: WO94/11966

PCT Pub. Date: May 26, 1994

[30] Foreign Application Priority Data

Nov. 9, 1992 [FI] Finland .................. 925072

[51] Int. Cl.[6] ........................... H04L 1/10
[52] U.S. Cl. ................ 375/357; 375/356; 370/216; 370/248; 370/503
[58] Field of Search .................. 375/354, 356, 375/357, 358, 224; 370/100.1, 100, 216, 221, 225, 248, 252, 530; 455/89, 58, 68; 340/825.5, 825.14, 825.2

[56] References Cited

U.S. PATENT DOCUMENTS

| | | | |
|---|---|---|---|
| 2,986,723 | 5/1961 | Darwin et al. | 340/147 |
| 4,347,490 | 8/1982 | Lee et al. | 340/825.02 |
| 4,701,756 | 10/1987 | Burr | 370/216 |
| 4,837,850 | 6/1989 | Maisel et al. | 455/58 |
| 5,027,375 | 6/1991 | Ernst | 375/356 |
| 5,327,425 | 7/1994 | Niwa et al. | 370/85.1 |

FOREIGN PATENT DOCUMENTS

| | | |
|---|---|---|
| 242117 | 10/1987 | European Pat. Off. . |
| 262705 | 4/1988 | European Pat. Off. . |
| 435395 | 7/1991 | European Pat. Off. . |
| 91690 | 7/1994 | Finland . |

OTHER PUBLICATIONS

Patent Abstract of Japan, JP1–112838, Jan. 5, 1989 See abstract.

Rogers: "Clock Source Selection Method in Distributed Communication System Networks", IBM Technical Disclosure Bulletin, vol. 25, No. 118, Apr. 1983, pp. 6293–6298.

*Primary Examiner*—Tesfaldet Bocure
*Assistant Examiner*—Bryan Webster
*Attorney, Agent, or Firm*—Cushman Darby & Cushman Intellectual Property Group of Pillsbury Madison & Sutro LLP

[57] ABSTRACT

A hierarchical synchronization method for a telecommunications system employing message-based synchronization and a telecommunications system employing message-based synchronization and including a plurality of nodes interconnected by transmission lines (A, B). In the method, the nodes interchange signals containing synchronization messages with information on the priority of the respective signal in the internal synchronization hierarchy of the system. In order to shorten the time periods of state transitions occurring in system failures without any risk of losing synchronization, a transmission line between two nodes is monitored to verify its bidirectionality, and as soon as the bidirectionality of the line cannot be verified, the use of the line for synchronization is prohibited.

5 Claims, 7 Drawing Sheets

HIERARCHICAL SYNCHRONIZATION METHOD AND A TELECOMMUNICATIONS SYSTEM EMPLOYING MESSAGE-BASED SYNCHRONIZATION

BACKGROUND OF THE INVENTION

The invention relates to a hierarchical synchronization method for a telecommunications system employing message-based synchronization and comprising a plurality of nodes interconnected by transmission lines, wherein the nodes interchange signals containing synchronization messages with information on the priority of the respective signal in the internal synchronization hierarchy of the system.

The invention also relates to a telecommunications system employing message-based synchronization and comprising a plurality of nodes interconnected by transmission lines and interchanging signals containing synchronization messages with information on the priority of the respective signal in the internal synchronization hierarchy of the system.

As used in the text below, the term node refers to a junction point between transmission lines in a system. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects the frequency of a signal from a neighbouring node or the frequency of its own internal clock source as the source of its own clock frequency. In order that all nodes in the system would operate at the same clock frequency, one usually attempts to make the system to synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritised and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighbouring node clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighbouring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stable situation. Priorities assigned to the nodes are indicated by numbers within the circles representing the nodes. The smaller the number, the higher the priority of the node. Synchronization messages transmitted by a node n (n=1 ... 6) are indicated by the reference MSGn. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the nodes by assigning each node a dedicated signature indicating the hierarchical level of the node, and the system synchronizes itself with the defined master clock independently by utilizing, if required, all existing internodal connections (cf. FIG. 1). If the connection to the master clock fails, and no alternative connection exists, or if the master clock fails, the system synchronizes itself with a node of the next highest level of hierarchy. FIG. 2 shows a situation when the master clock in the system shown in FIG. 1 fails. Response to a change in synchronization takes place by message interchange between nodes. When the timing source of the node fails, the synchronization hierarchy is reestablished beginning from the point of break (away from the master device of the system). This takes place e.g. in such a manner that the node that detects the break first enters into a state of internal timing for a preset time period and then forwards information about the change. When the next node detects the changed situation, it also enters into a state of internal timing for a preset time period and forwards information about the change, etc. After the expiry of the preset time periods of the individual nodes, the reestablishment of the synchronization hierarchy starts. The resulting hierarchy is usually similar to the original hierarchical structure where the failed connection is replaced with an operative one while the structure otherwise remains nearly unchanged.

A network utilizing message-based synchronization is described e.g. in U.S. Pat. Nos. 2,986,723 and 4,837,850. Both patents disclose methods in which time periods depending on the size and configuration of the system are used in the case of system failures. During the time periods the nodes are forced into another state in order to prevent inappropriate synchronization in failure situations. Information about of the failure is forwarded in failure situations by using the messages of the system. After information about the changed situation has been distributed throughout the system or over a sufficiently large area, the synchronization is reestablished around the point of change or possibly also at a greater distance, if required. The time periods ensure that information about the change will be distributed over a sufficiently large area. On detecting a change/failure, the node forwards information about it and starts its own timer and proceeds in a predetermined manner (enters into a predetermined state). After the preset time has expired, the node again starts its normal procedures for obtaining timing, and the system begins to be resynchronized within portions affected by the change/failure.

As the preset time periods are dependent on the system size and configuration, they are difficult to set. In larger systems the time periods easily become too long, which impedes the maintenance of required quality in timing. When the system is expanded, the time periods have to be reset and each node has to be informed of the new time periods.

SUMMARY OF THE INVENTION

The object of the present invention is to provide a system which avoids the above-described disadvantages and allows the time periods to be shortened without any risk of losing synchronization. This is achieved by a method according to the invention which is characterized in that a transmission line between two nodes is monitored to verify its bidirectionality, and as soon as the bidirectionality of the line cannot be verified, the use of the line for synchronization is prohibited. A telecommunications system according to the invention, in turn, is characterized in that the system node comprises interface-specific monitoring means for determining whether each line is uni- or bidirectional, said monitoring means being connected to a synchronization decision means of the node.

The invention rests on the idea that lines in use are monitored so as to verify their bidirectionality, and the use of a line for synchronization is prohibited if the line is found to be unidirectional or its bidirectionality cannot be verified reliably.

BRIEF DESCRIPTION OF THE DRAWINGS

In the following, the invention and its preferred embodiments will be described more closely with reference to the examples of FIGS. 3 to 10 in the attached drawings, in which.

DETAILED DESCRIPTION

Figure 1:
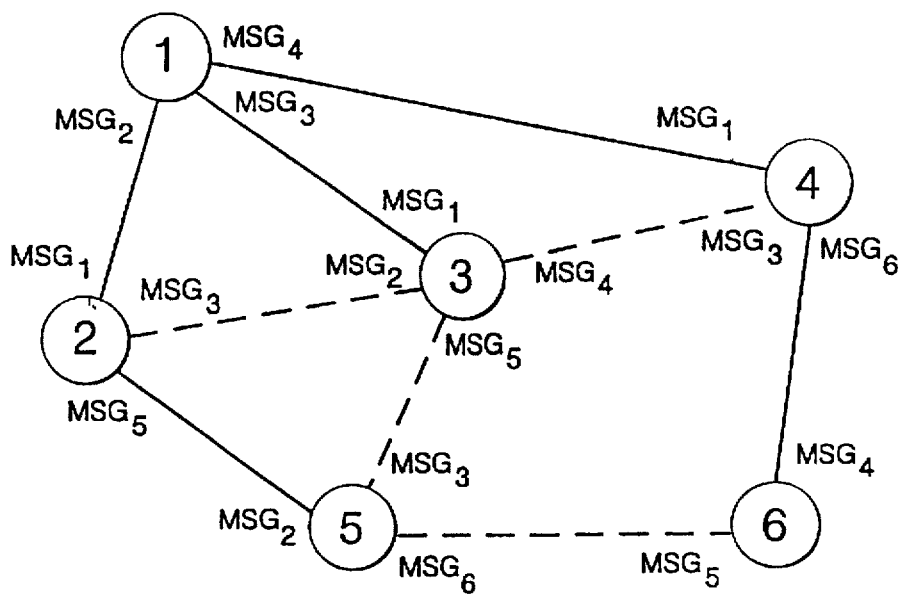
FIG. 1 shows the general configuration of a system employing message-based synchronization when the system is in synchronization with the clock frequency of a master source.
Figure 2:
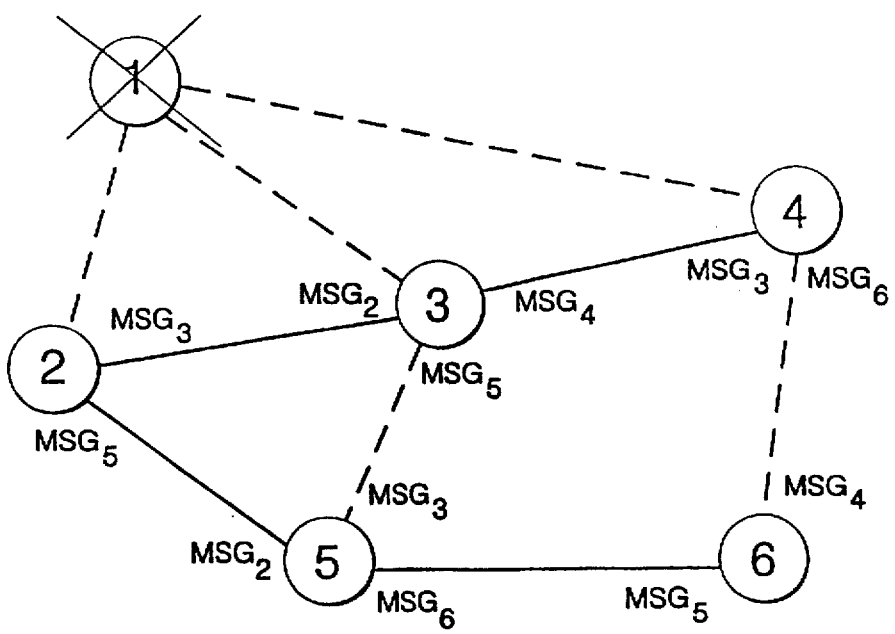
FIG. 2 shows the network of FIG. 1 when the master node has failed.
Figure 3:
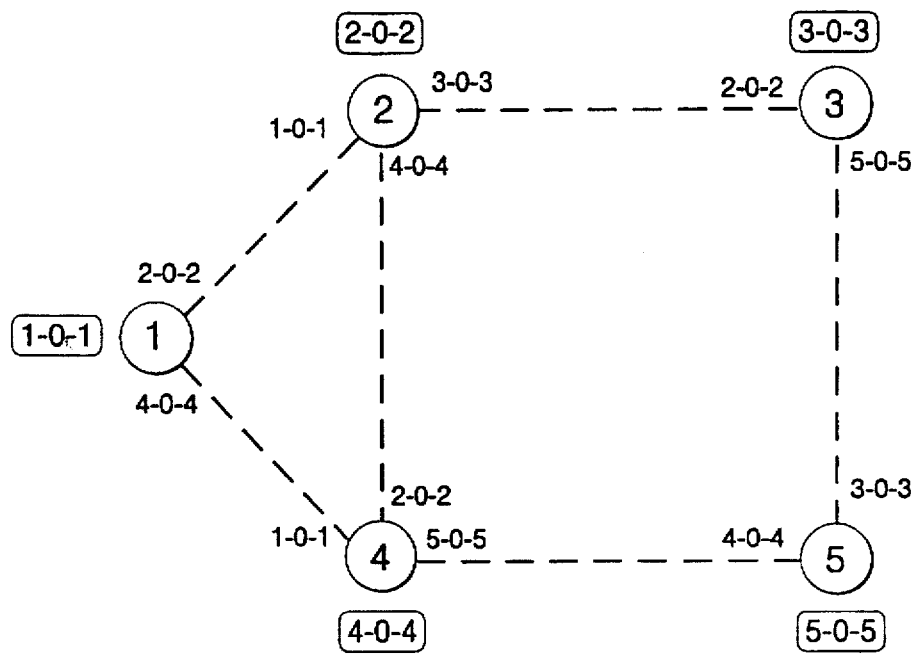
FIG. 3 shows a network employing self-organizing master-slave synchronization (SOMS) in an initial state.

FIG. 3 illustrates a system employing self-organizing master-slave synchronization (SOMS), a prior art message-based synchronization method. In this specific case, the system comprises five nodes (or devices) which are assigned SOMS addresses according to their level of hierarchy, the addresses being indicated by the reference numerals 1 ... 5. (The master node of the system has the smallest SOMS address.) The nodes interchange messages containing such SOMS addresses. In this way they are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master node, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighbouring nodes as its new synchronization source on the basis of an incoming SOMS signature, it has to regenerate its own SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of clock frequency. Of course, the outgoing SOMS message there-by employs the internal SOMS signature.

The nodes transmit continuously SOMS messages in all directions in order that any changed data in the SOMS signatures would be distributed as rapidly as possible and that they would know the current operating condition of neighbouring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until three successive faulty SOMS messages have been received. At this stage the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-0-X to the other nodes. This signature is also compared with incoming SOMS signatures. If none of the incoming signatures is smaller than the internal signature, the node continues to use its own internal timing.

In FIG. 3, the SOMS network is shown in an initial state when none of the nodes (or devices) has yet processed anyone of the incoming SOMS messages. In all nodes, the highest priority is assigned to the internal SOMS signature of the node as no other signatures have yet been processed. In FIG. 3, the SOMS signatures are indicated beside each node to which they are transmitted, and the selected signature is framed (in the initial situation shown in FIG. 3 all nodes employ their internal timing source). Lines used in synchronization are drawn by a continuous line and standby lines are drawn by a broken line (in the initial situation shown in FIG. 3, all lines are standby lines).

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time the nodes generate their own new SOMS signatures as described above and provide their outgoing SOMS message with the new signature. The network in a stable situation is shown in FIG. 3. All nodes have synchronized with the master node 1 over the shortest possible path.

Figure 4:
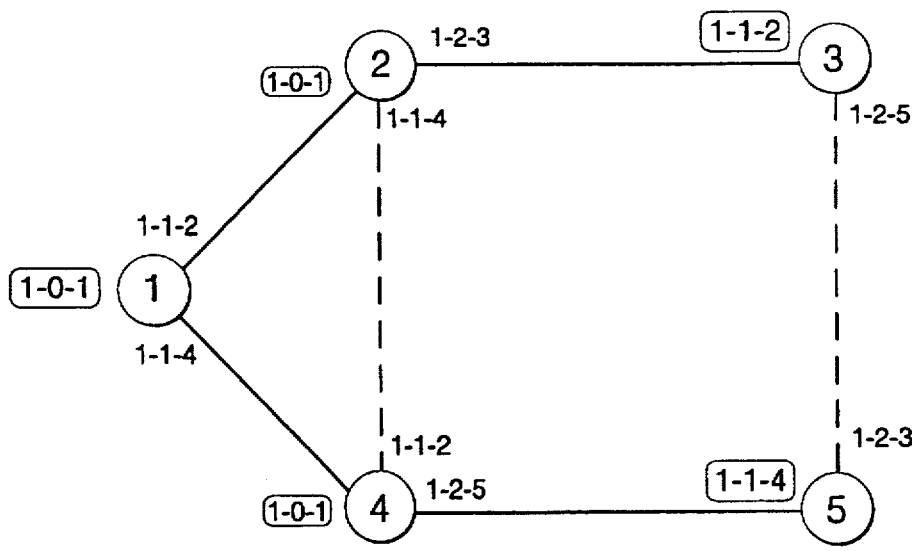
FIG. 4 shows the network of FIG. 2 in a stable state.
Figure 5:
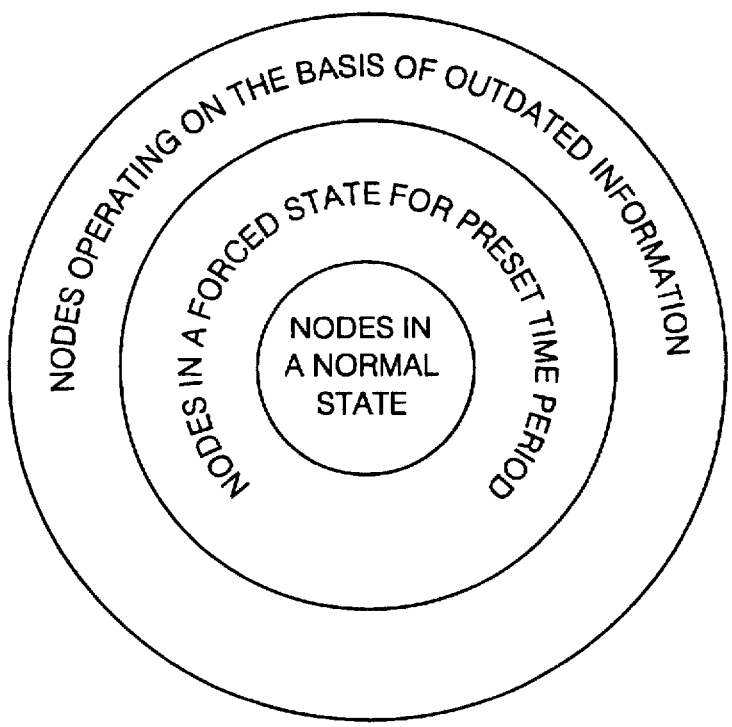
FIG. 5 illustrates the state of a system employing message-based synchronization during a change situation.

The system illustrated in FIGS. 3 and 4 is described in the above-mentioned U.S. Pat. No. 2,986,723. The preset time period of forced internal timing disclosed in this patent can be shortened so that it will be a constant independent of the system size and configuration. However, it is thereby necessary to ensure the distribution of appropriate information in other ways (the matter is described in greater detail in the parallel FI Patent Application 925073). In this kind of system, information about a change starts to be distributed in the form of a front simultaneously in all directions from the point of change. Accordingly, the area which is aware of the change that has occurred is integral and expands continually outwardly from the point of change. It may therefore happen that nodes located centrally within the area start to make decisions about the changed situation before all of their neighbouring nodes are aware of the change. This situation is illustrated in FIG. 5, where the point of change is represented by the common centre of the circles; nodes within the innermost circle are already in a normal state; nodes within the next outer circle are in the forced state for a preset time period; and the nodes within the outermost circle still operate on the basis of outdated information.

If the system uses a shortened time period, it has to be ensured that outdated information will not return to the area which has already responded to the change and within which part of the nodes have already reverted to the normal state. As appears from FIG. 5, outdated information cannot enter the central area from the outermost area as the devices in the forced state for a preset time period will not accept any new synchronization messages in this state. The only way for outdated information to enter the central area from the outermost area in FIG. 5 is to utilize a unidirectional line over which no information has been distributed outwardly from the point of change (due to unidirectionality).

Forced transition to internal timing does not necessarily eliminate faulty synchronization signatures in the system when the system is divided into two portions. Faulty synchronization signatures may remain circulating in the system portion that has no connection to the master node of the system after a change/failure, which causes e.g. unstable oscillation in synchronization.

FIGS. 6a to 6f show a case in which the above-described situation occurs in a SOMS system. Nodes in the forced state of internal timing at a specific time are indicated by underlining the respective number. A line between nodes 17 and 20 is unidirectional (from node 20 to node 17, as shown by the arrow); the other lines are bidirectional. At the first stage (FIG. 6a), node 17 loses its connection to the rest of the system. On detecting that the connection has failed, node 17 is forced into the state of internal timing (FIG. 6b), and starts to transmit its internal synchronization signature 17-0-17. Due to the unidirectionality of the line, node 20, however, will not yet be informed of the failure. At the following stage (FIG. 6c), node 18 detects the change and is forced into the state of internal timing. Thereafter (FIG. 6d), node 19 is forced into the state of internal timing, and node 17 reverts to the normal state, and so it accepts the synchronization message received from node 20, being thus synchronized with node 20. It is not until after this (FIG. 6e) that the wave of forced timing reaches node 20; however, the outdated synchronization signature has already caused the loss of synchronization in the system portion shown in the figures. At the same stage node 18 has reverted to the normal state and accepted the signature from node 17. Thereafter (FIG. 6f) the vicious circle continues after node 19 has reverted to the normal state, and node 17 has been forced into the state of internal timing.

In this kind of SOMS system, each node in its turn is forced into the state of internal state for a preset period, whereas they are otherwise synchronized with each other in accordance with their numbering. This vicious circle continues until the synchronization distance counter (D2) exceeds its greatest allowable value, so that the synchronization signature is found to be faulty. Before this stage, however, the synchronization has already been lost.

The system disclosed in U.S. Pat. No. 4,837,850 referred to above may also result in a situation described above if the time period of the system has not been determined properly. This kind of situation may be encountered e.g. when the system is expanded, or as a result of failure when the system configuration changes. For instance, it is thereby possible that a message paging the master node has not yet been distributed over the entire system before the expiry of the time period assigned to the node that transmitted the message. In such a case, the node that transmitted the paging message may receive an outdated synchronization signature over a unidirectional line, as a result of which it will not be synchronized properly.

The solution according to the invention enables the time periods of the system to be shortened without any risk of the loss of synchronization as a result of situations described above.

In order that the unidirectionality of an inter-nodal line could be detected, communication is required between the nodes. In practice, such communication may vary from transmission of one bit to a handshaking procedure performed by messages. For this purpose, the prior art devices (nodes) have to be provided with means for determining whether the line is unidirectional or bidirectional, and means for prohibiting the use of the line for synchronization whenever the bidirectionality of the line has not been verified. These means are incorporated in interface-specific message processing means in the node, and depending on the implementation, possibly in the synchronization decision means of the node, which selects the synchronization signature to be applied.

Figure 7:
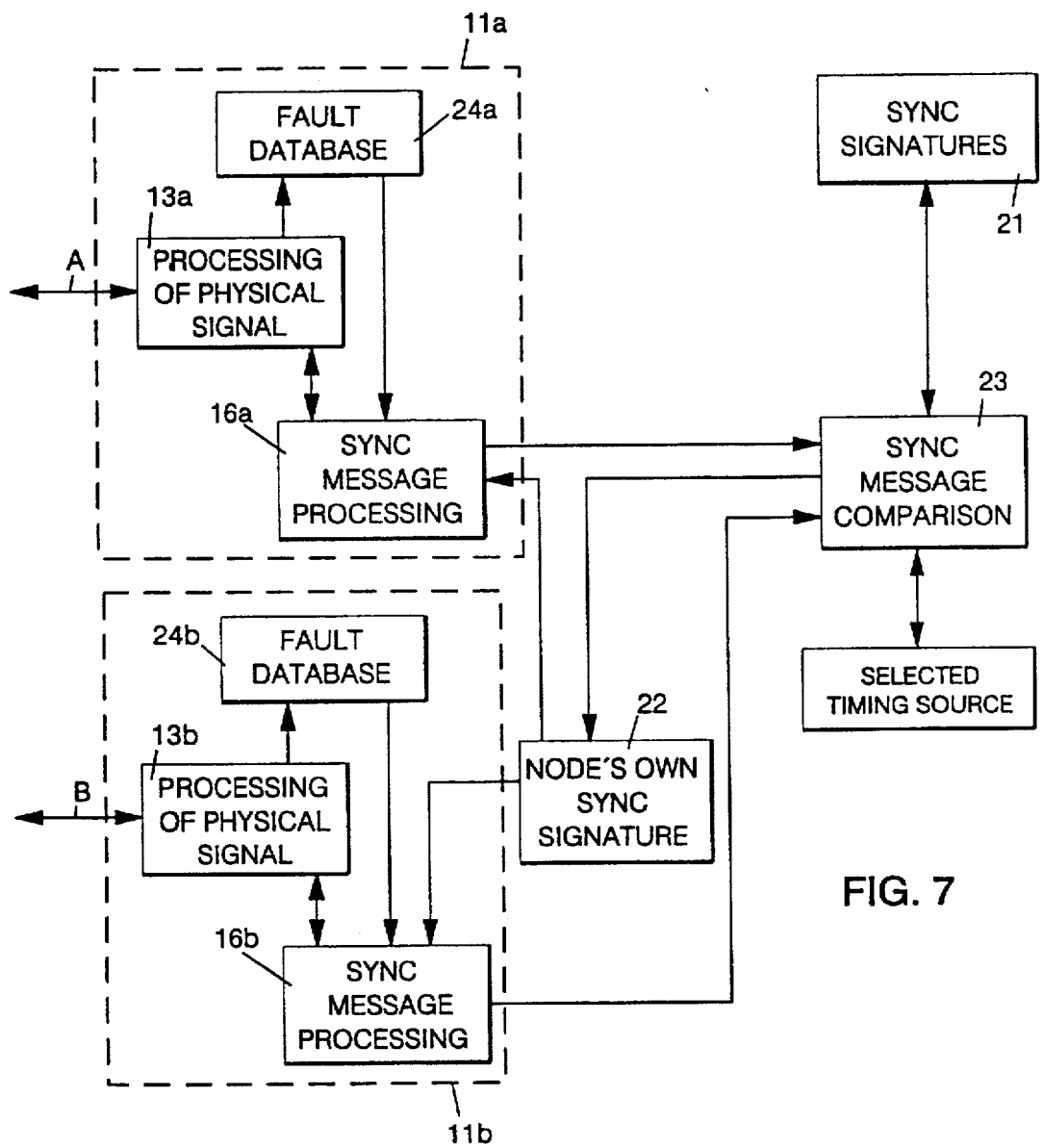
FIG. 7 illustrates means provided in an individual node for realizing the method according to the invention.

FIG. 7 shows means provided in a node for monitoring the uni/bidirectionality of a line and for selecting the timing source. The figure shows two lines A and B between a system node and neighbouring nodes. The bi- or unidirectionality of the line is determined in interface-specific transmission and reception blocks 11a and 11b. The transmission link of each line is connected to a signal transmission and reception means 13a and 13b, respectively, which perform the processing of the physical signal. The means 13a and 13b forward the synchronization message to an associated synchronization message transmission and reception means 16a and 16b, respectively. The synchronization message transmission and reception means e.g. check that the message is faultless and forward the message to a centralized synchronization decision means 23 having each one of its inputs connected to the output of the respective reception means 16a and 16b. The signal transmission and reception means 13a and 13b also monitor the quality of the received signal and store data thereon in interface-specific fault databases 24a and 24b, respectively. The synchronization message transmission and reception means 16a obtains the fault data from the database 24a, and the transmission and reception means 16b from the fault database 24b. Monitoring a line for a failure/change takes place in the signal transmission and reception means in a manner known per se.

The decision means 23 compares the messages and stores them in a memory 21 e.g. in priority order so that the selected synchronization signature has always the highest status.

In the above-described node, the unidirectionality of the line may be attended to in two ways. In the first embodiment, the synchronization message transmission and reception means 16a or 16b, respectively, transmits a separate message to the decision means 23 whenever it detects that the respective line is unidirectional or becomes unidirectional. So the decision means knows that this line must not be used for synchronization (and it will not store the respective signature into the memory 21). In the second embodiment the synchronization message transmission and reception means 16a or 16b transmits, on being informed of the line becoming unidirectional, a synchronization signature with the worst possible value (for instance, the value MAX-MAX in the SOMS network) to the decision means 23. As a consequence this line will not be used for synchronization as even the node's own internal clock has a better synchronization signature. The node's own outbound synchronization signature is stored in a memory 22 which applies it to the synchronization message transmission and reception means in each interface.

In failure situations the reception end is always informed of a failure occurring in the transmission direction; in some systems, the receiving party also transmits information about the failure to the transmitting party (such as PCM lines complying with the CCITT specification G.704). In the case of failure it is possible in such cases to utilize the existing information of the devices. However, it is not thereby possible to know whether the line was originally bidirectional as individual transmission directions may e.g. cross between the devices. A sudden change in the switching of the lines may also cause bidirectional lines to turn into individual unidirectional lines, which cannot always be detected by means of failure identifications normally in use.

The easiest way to prevent the use of unidirectional lines for synchronization is to include in the synchronization message to be transmitted such information that it can be determined whether a signal received from a certain direction can be used for synchronization or not. In practice, this can be accomplished by two basic alternative ways which do not require internodal communication.

One way, which does not require any assumptions to be made, is to include in the synchronization message a synchronization path indicating all nodes through which the synchronization has passed. Each node checks whether it is already included in the synchronization path included in the message. If so, the message must not be used for synchronization as the path cannot be the shortest connection to the master node of the system. In the example of FIGS. 6a to 6f, for instance, node 17 would detect at the stage of FIG. 6d that it is included in the synchronization path of the message from node 20, and so it would not accept the signature 1-10-20, as it normally would do. In practice, the addition of the synchronization path to the synchronization message makes the message considerably longer. It is therefore not advisable to add the path, if such information is not utilized otherwise in the synchronization.

Unidirectional lines can be eliminated with a considerably smaller increase in the message length though it is thereby necessary to assume that an individual node is able to couple a certain incoming direction with a certain outgoing transmission direction (e.g. the device has a port having both an incoming and outgoing transmission direction). If a further assumption can be made that both transmission directions of the port are connected to the same neighbouring node, a single bit need to be added to the message to be transmitted. This bit indicates whether the port receives any identifiable messages containing a synchronization signature and whether the signal is of adequate quality. If the device obtains the above-mentioned marking bit with the incoming line of the port, it knows that the other end also obtains the message, and so the line is bidirectional and can be used for synchronization.

Figure 8A:
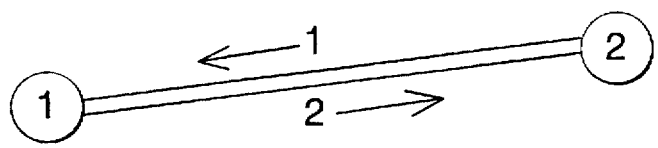
FIGS. 8a and 8b illustrate a principle of detecting the unidirectionality of a line.
Figure 8B:
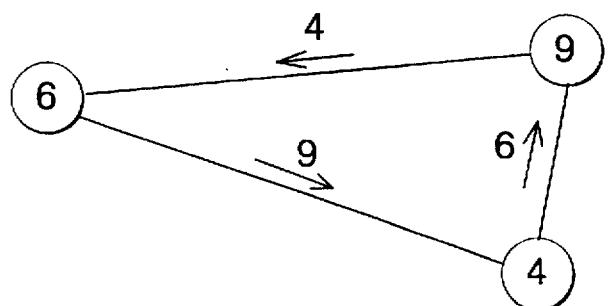
Figure 6A:
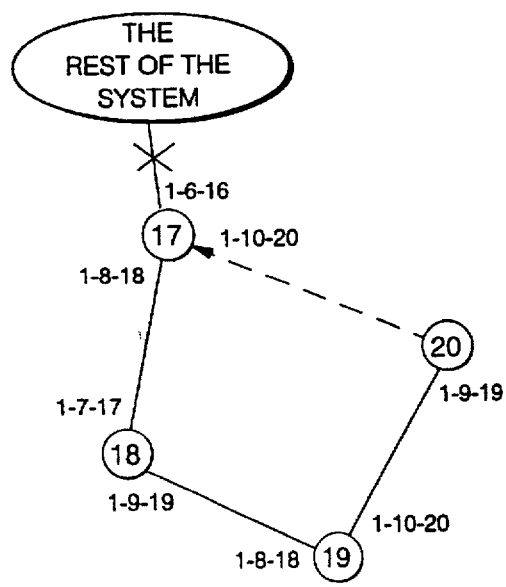
FIGS. 6a to 6f illustrate procedural stages during which faulty synchronization signatures remain within a system portion, resulting in the loss of synchronization.
Figure 6B:
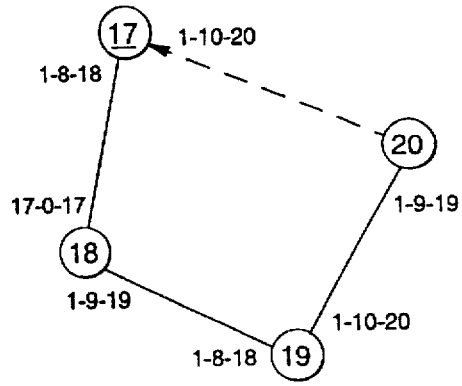
Figure 6C:
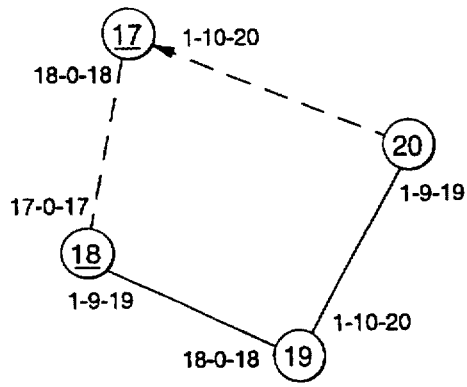
Figure 6D:
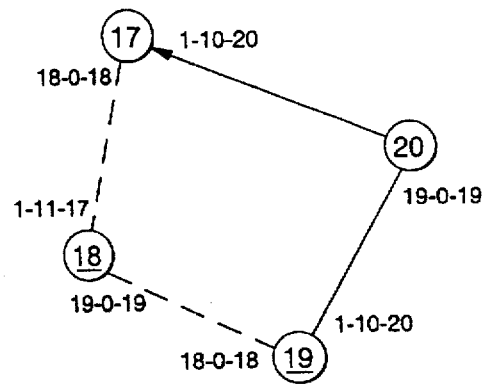
Figure 6E:
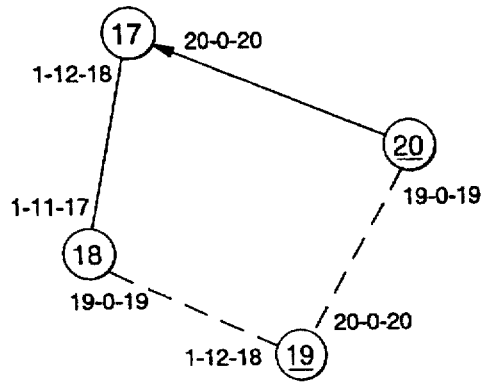
Figure 6F:
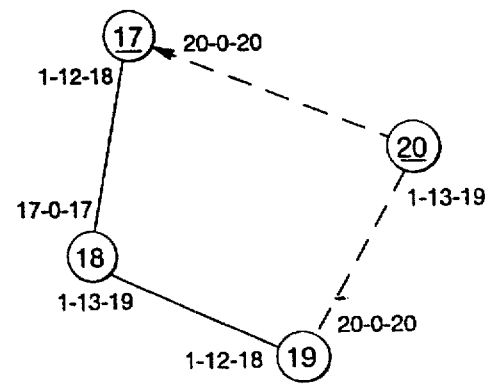

If it cannot be assumed that both transmission directions of a port are connected to the same neighbouring node, the addition of a single marking bit to the message is not enough. In such a case, each message to be transmitted has to be provided with information indicating from which node the incoming message of the port originates. In the above-described SOMS system, this information is derived from the last part (D3) of the synchronization signature. In other prior art methods, the information possibly has to be added to the message (if it does not already exist in the message). If the incoming message of the node contains information indicating that the neighbouring node receives a message from this node at the same port from which it transmitted the message to this node, the port can be used for synchronization. This is illustrated in FIGS. 8a and 8b. In the case of FIG. 8a, the bidirectionality of the line can be detected as both nodes (1 and 2) get back their own address from the other communicating party. In the case of FIG. 8b, none of the nodes (4, 6 or 9) gets back its own address as none of the lines is bidirectional.

The length of the synchronization message need not be increased needlessly when the use of unidirectional lines for synchronization is prevented by a handshaking procedure in two directions. When a line is switched on, both communicating parties shake hands to verify the bidirectionality of the line before any actual synchronization messages are transmitted. The handshaking is repeated after each break, and it is realized in the synchronization message transmission and reception means (cf. FIG. 7). As used herein a break refers to any state in which the signal cannot be used as a source of timing. The break may thus be either a total break in communication or only a failure. For instance, in a 2 Mbit/s PCM line, the input signal contains an AIS (Alarm Indication Signal), the input signal has no frame alignment or CRC multiframe alignment, the error ratio in the frame alignment word of the input signal is too high, or the input signal contains a far end alarm.

Figure 9:
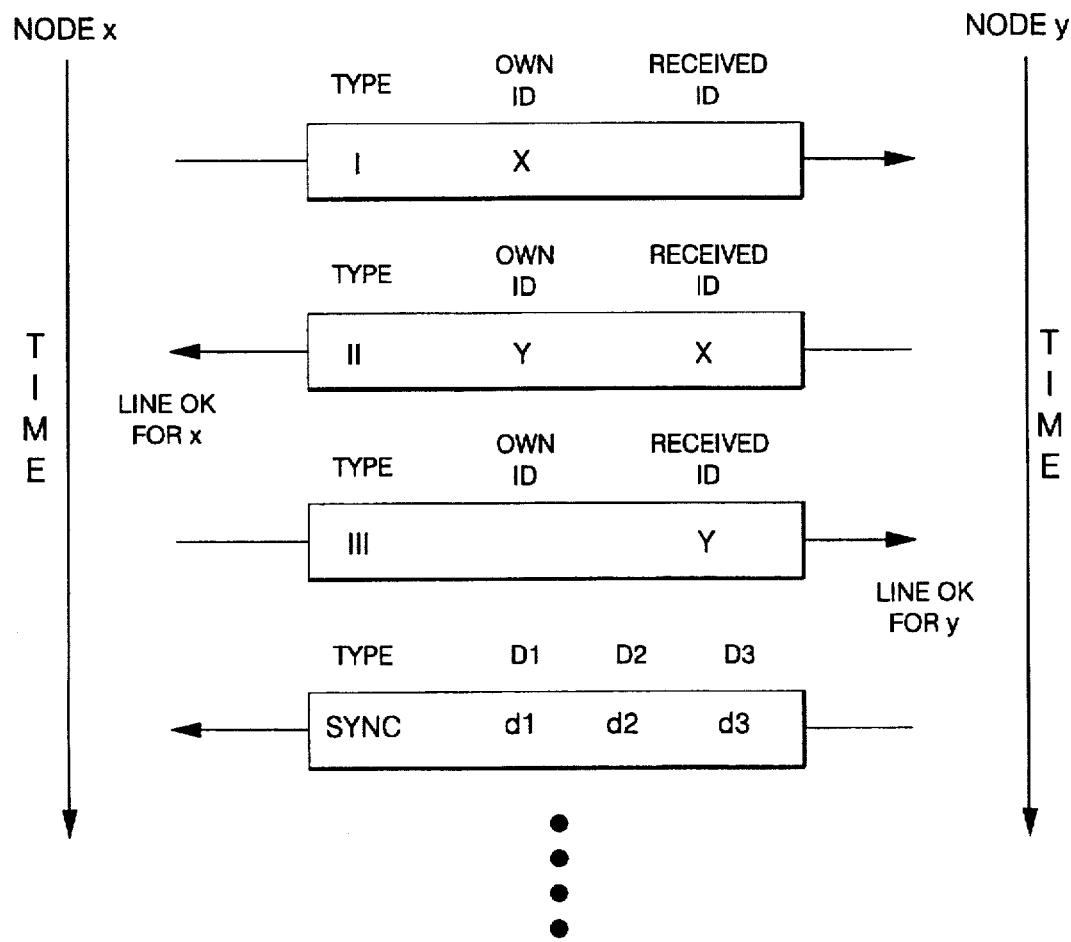
FIG. 9 illustrates the monitoring of a line by a handshaking procedure.

Handshaking is based on the principle that one communicating party transmits its own unambiguous identity to the other party, which then has to return the received identity. When the device's own idenity is returned, it has been verified that the line is bidirectional. FIG. 9 shows a simplified example of the realization of handshaking between nodes x and y. Three different message types are used: message type I performs requesting, and contains the identity of the transmitting party; message type II performs both responding and requesting, and contains both identities; and message type III performs responding, and contains the received identity. When node x detects that the line is again operative after a failure, it transmits message I, which contains a line identity (X) of the transmitting party. The line identity identifies the transmitting node and its port unambiguously- The identity consists of the node's synchronization address and the port number. When the other communicating party receives this message, it responds to it by message II, which contains the line identities (X and Y) of both nodes. When node x that initiated the handshaking gets back its own identity within the message, it knows that the line is bidirectional and may return the line identity (Y) of the other communicating party by transmitting message III as an acknowledgement. Then the transmission of normal synchronization messages is started (node y transmits its own synchronization signature d1-d2-d3)

In order to avoid unclear situations caused by changes in the switchings of the system, the addresses of the parties transmitting synchronization messages may be monitored during normal synchronization communication. In the SOMS system, for instance, information concerning the transmitting party of the message is indicated by the last part D3 of the signature; in other methods it may be necessary to add this information to the synchronization message. The party transmitting the synchronization message must all the time remain the same as the transmitting party obtained as a result of the handshaking. Comparison between these addresses is performed in the synchronization message transmission and reception means (FIG. 7). If a false response or a message of the wrong type is obtained from the handshaking procedure, the received synchronization signature is rejected. In such a case the line must not be used for synchronization. After a predetermined period of time, the handshaking is restarted. If either one of the nodes suspects that there occur difficulties over the internodal line as far as bidirectionality is concerned, it may start the handshaking procedure at any time by transmitting message I.

Figure 10:
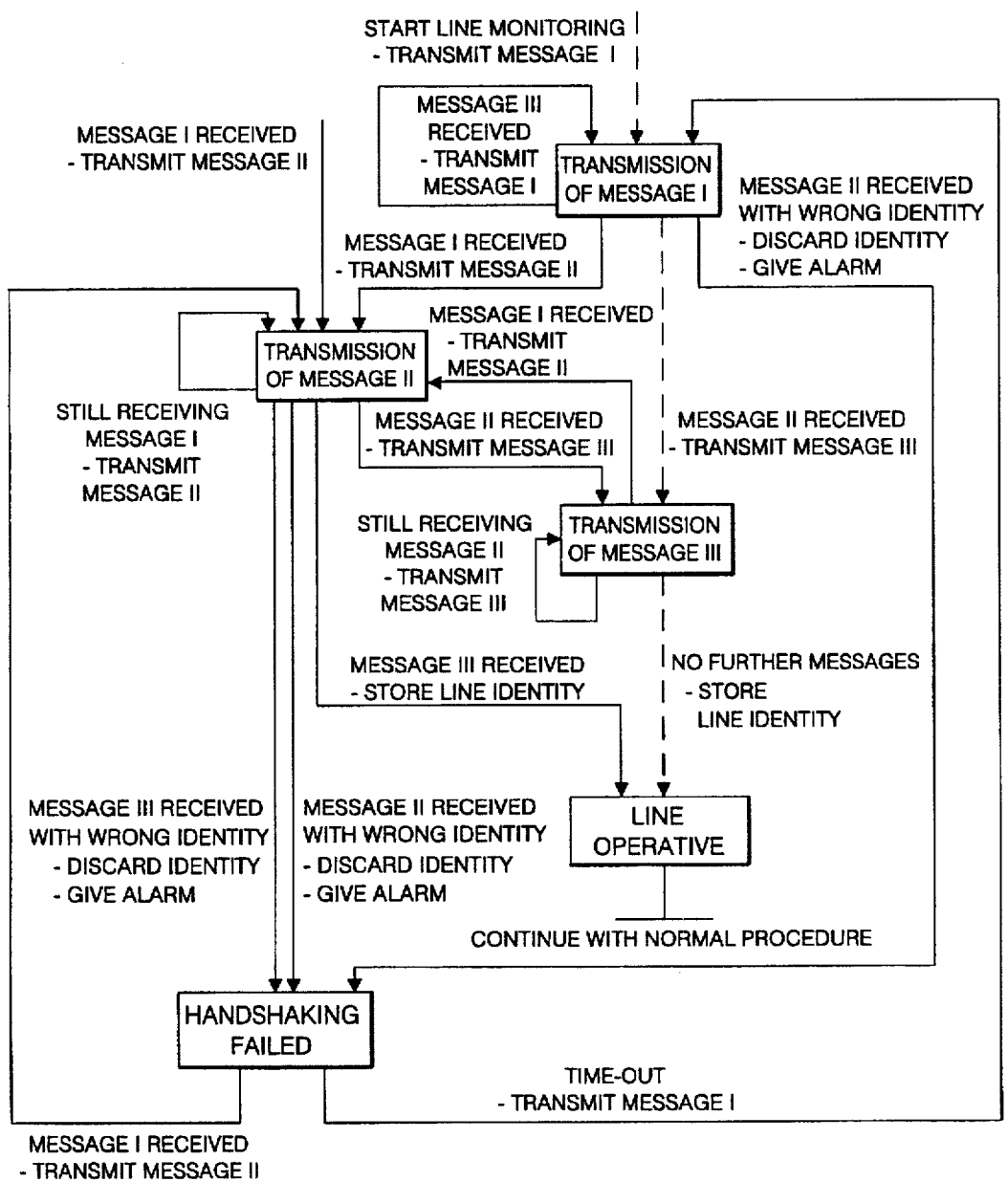
FIG. 10 shows a state machine realizing hand-shaking.

A state machine realizing the handshaking procedure described above is shown in FIG. 10, in which the condition for each state transition is stated in connection with the respective transition, and a required procedure is indicated below the condition and separated from it by a dash. The most linear case shown in FIG. 9 is indicated in FIG. 10 by broken lines. As appears from the figure, there are several alternative paths leading to the block "line operative". For instance, message II is not necessarily received after the transmission of message I (as in the linear alternative), but message I, for instance, may be received if the other end has detected that the line is again operative substantially at the same time and starts the handshaking procedure substantially simultaneously. In addition, the state machine shown in the figure operates on the principle that a certain message is never awaited from the other party, but the handshaking is speeded up by always taking into account the message received from the other party. For instance, if message I is received after the transmission of message I, the transmission of message II is started immediately.

Even though the invention has been described above with reference to the examples of the attached drawings, it is obvious that the invention is not limited to it but it may be modified within the scope of the inventive idea disclosed above and in the attached claims. As appears from the above, the solution according to the invention is applicable in various types of systems applying message-based synchronization methods.

I claim:

1. A hierarchical synchronization method for a telecommunications system employing message-based synchronization, having an internal synchronization hierarchy including a plurality of priorities, and comprising a plurality of nodes interconnected by respective transmission lines, comprising the steps of:
    (a) exchanging, between the nodes by transmitting from ports in the nodes, signals containing synchronization messages containing information as to the priorities of the respective signals in the internal synchronization hierarchy of the system;
    (b) monitoring one of the transmission lines between a respective transmission line, including performing a handshaking procedure in two directions between the respective nodes, at least when said one transmission line is switched on and after a failure of the line is eliminated;
    (c) prohibiting use of said one transmission line for synchronization when bidirectionality of said one transmission line cannot be verified as a result of practicing step (b);
    (d) monitoring an address of a party transmitting a synchronization message received at a node over a particular transmission line in the course of conducting step (a), and
    (e) prohibiting use of said particular transmission line for synchronization, if the address of the transmitting party obtained as a result of performing said handshaking procedure is not equal to the address monitored in step (d).

2. The method according to claim 1, further comprising:
   restarting performance of said handshaking procedure after a predetermined time, if the address of the transmitting party obtained as a result of performing said handshaking procedure is not equal to the address monitored in step (d).

3. The method according to claim 1, further comprising:
   providing each synchronization message transmitted from a respective port in a respective node with information indicating from which node the respective synchronization message entering the respective port originates if this information is not already included in the respective synchronization message.

4. The method according to claim 1, wherein the step of prohibiting comprises:
   assigning a signature corresponding to the lowest one of said priorities to said one transmission line.

5. A telecommunications system employing message-based synchronization, having an internal synchronization hierarchy, and comprising:
   a plurality of system nodes interconnected by transmission lines and interchanging signals containing synchronization messages with information on the priority of the respective signal in the internal synchronization hierarchy of the system;

each of said system nodes comprising interface-specific monitoring means for determining whether each of said transmission lines is uni- or bidirectional;

said interface-specific monitoring means comprising:
      means for transmitting and receiving handshaking messages and thereby performing a handshaking procedure; and
      means for comparing an address of a respective transmitting party received over the respective one of said transmission lines during synchronization, with an address of the respective transmitting party obtained as a result of said handshaking procedure; and said monitoring means being connected to a synchronization decision means of the respective one of said system nodes.

* * * * *